United States Patent [19]
Merritt et al.

[11] Patent Number: 5,921,683
[45] Date of Patent: Jul. 13, 1999

[54] BEARING ARRANGEMENT FOR AIR CYCLE MACHINE

[75] Inventors: Brent J. Merritt, Springfield, Mass.; Clarence J. Wytas, Jr., Stafford Springs, Conn.

[73] Assignee: United Technologies Corporation

[21] Appl. No.: 08/928,441

[22] Filed: Sep. 12, 1997

[51] Int. Cl.⁶ .................................................. F16C 17/03
[52] U.S. Cl. ........................................ 384/106; 384/103
[58] Field of Search ................................. 384/103, 106, 384/906, 100, 104

[56] References Cited

U.S. PATENT DOCUMENTS 5,032,028  7/1991  Riazuelo et al. ........................ 384/103
5,634,723  6/1997  Agrawal ................................. 384/103

*Primary Examiner*—Lenard A. Footland

[57] ABSTRACT

A journal bearing designed for use with a rotatable shaft of an air cycle machine is disclosed. The bearing includes a journal bearing housing, air bearings for facilitating rotation of the shaft, and a journal bearing shell positioned in the housing. The shell includes a single piece body structure having a first half integral with a second half. The first half includes a first outside end and the second half includes a second outside end. The first half is sufficiently spaced from the second half for supporting and aligning the air bearing for supporting the rotatable shaft. The first and second integral halves define a continuously formed inner diameter adapted to receive the air bearings between the rotatable shaft and the inner diameter for facilitating rotation of the shaft relative to the body structure. The continuously formed inner diameter extends from the first outside end to the second outside end and an outer surface for placement and securement in the journal bearing housing of the air cycle machine is provided.

9 Claims, 3 Drawing Sheets

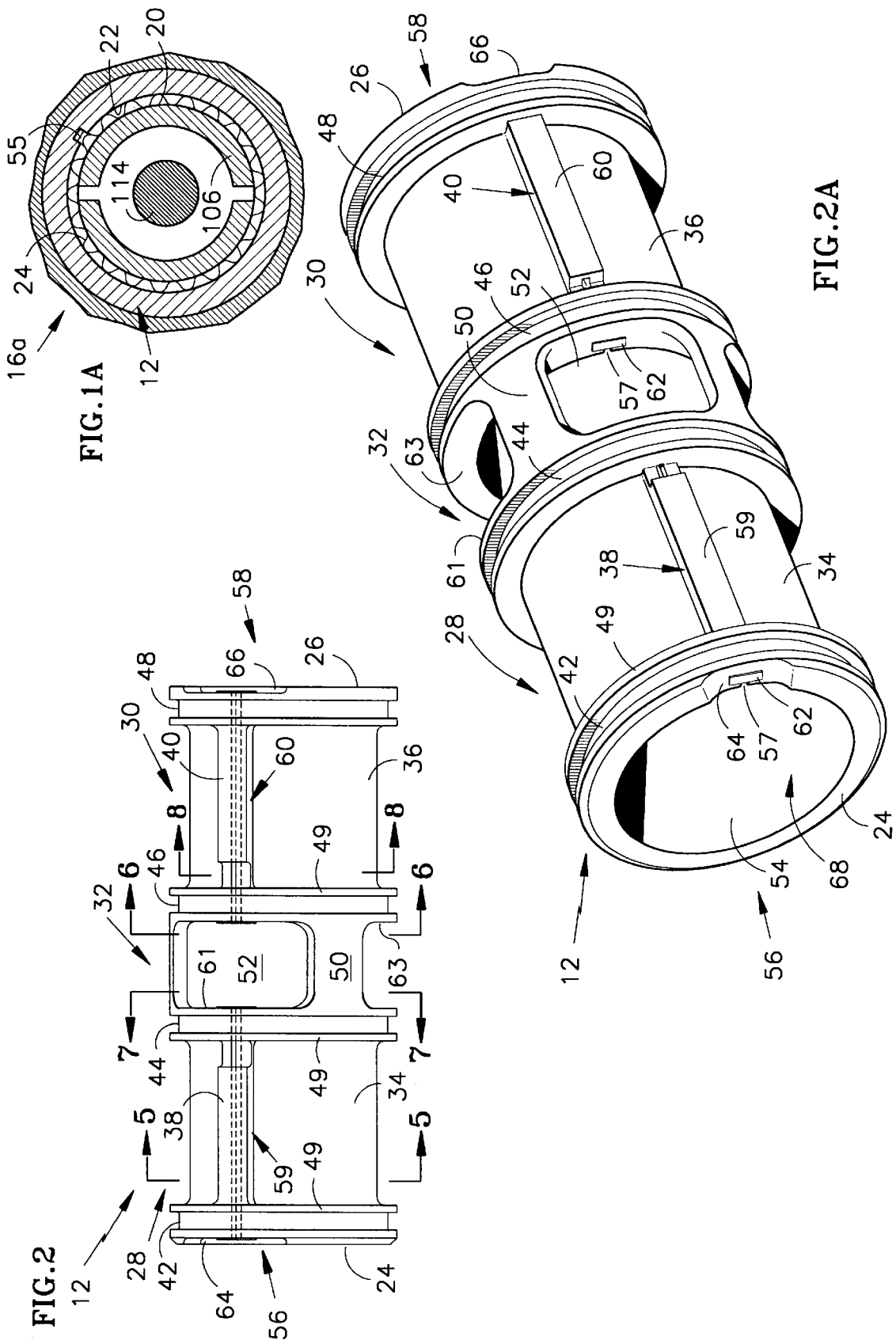

BEARING ARRANGEMENT FOR AIR CYCLE MACHINE

TECHNICAL FIELD

This invention relates to gas bearing assemblies for rotating members, and more particularly, to a hydrodynamic bearing assembly for an air cycle machine.

BACKGROUND ART

Environmental control systems for aircraft typically employ air cycle machines and heat exchangers to cool and condition high pressure air supplied by either the engines or an auxiliary power unit. In these systems, compressed supply air is further compressed in a compressor and cooled in a heat exchanger, and then expanded in a turbine. The turbine outlet air, cooled by expansion, then flows into the aircraft. Since the aircraft air is maintained at a lower pressure than the supply air, properly designed systems provide conditioned air at temperatures low enough to cool both the cabin and the aircraft avionics.

In the typical air cycle machine, a pair of hydrodynamic journal bearings are used to regularly locate and support the shaft. For optimum machine performance, very small clearances between the stators, fixed to the machine housing, and the tips of the compressor and turbine blade must be maintained. Since the compressor and turbine rotors, to which the blades are attached, are connected to the shaft, if the bearings allow more than slight amounts of radial free play then the shaft would shift when loaded and the blade tips would contact the stator surfaces encircling them, causing damage to the machine.

In a first type of air cycle machine, each journal bearing is mounted in a separate segment of the turbine and compressor housings. These housings are generally made from aluminum and have thick wall portions. In machines of this type, a journal bearing is mounted directly in each separate segment of the housing. Bearing alignment is achieved by machine matched bores in the housing. However, as the machines use dissimilar metals in the housing (aluminum) and the rotating members (stainless steel), the clearance between rotating members and the housing are very critical. Failure of this type of machine can be very expensive because both the rotating member and the entire housing must be replaced if the bearings fail. See, for example, U.S. Pat. Nos. 4,725,206, 4,786,238, and 4,503,683.

In another type of machine a journal bearing shell is disposed between the bearings mounted on the rotating member and those mounted on the stationery housing. As they offer minimal freeplay and reliable operation at high speed, hydrodynamic fluid film journal bearings are used to locate the rotating shaft member radially. The journal bearing shell provides better thermal compliance and improved mechanical dampening, and is more cost effective if a bearing failure occurs since only the journal shells and bearing, and not the entire turbine and compressor housings must be replaced. In machines of this type, however, since each journal bearing is mounted in a separate segment of the housing, matched sets of journal shells and machine portions of the rotating shaft must be provided. An inner race of each bearing connects to, or is part of a shaft, while the outer race of each bearing attaches to the housing through the shell. The correct clearance must be maintained between the inner and outer races to ensure that the magnitude of the hydrodynamic bearing forces remain constant during operation. Thus, the most important operating parameter for hydrodynamic journal bearings is journal alignment. Any misalignment of the journal bearing with respect to the axis of rotation of the rotative assembly will cause radial loads to be generated and these radial loads limit the life of the machine, or if they become excessive can cause immediate failure of the machine. An example of this type of machine comprising two journal bearings in two different bearing shells can be found, for example, in U.S. Pat. No. 5,113,670. Since two journal bearings are used in this type of machine to support the shafts, both bearings' center line must be located as close to the same axis as possible. In these machines, each journal bearing is mounted in a separate segment of the housing. Pilots, matched sets of two corresponding machine annular surfaces located at the outer most diameter where each housing segment contacts another segment, maintain the relative radial locations of adjacent segments. In each matched pilot set, a first surface is located on the inside of the outer housing wall of one segment. A second surface, with included O-ring glands, is located on the outside of the outer housing wall of the adjacent segment. When assembled, the second surface sets inside the first, and the machine first inner surfaces rests on an O-ring installed into this gland, fixing the relative radial orientation of these two segments. If the pilots on each housing segment are concentric with the journal bearing bore, when the housing is assembled, perfect machine alignment is achieved. However, given the large diameter of the pilots relative to the bearing diameters, machining pilot surfaces onto the housing segments to such close tolerances is both difficult and expensive. In an effort to overcome this problem an alignment fixture has been disclosed in U.S. Pat. No. 5,142,762. While this approach ensures improved bearing alignment, it also requires that after the fixture is used to obtain the relative orientation of each segment, the segments be disassembled to remove the fixture and then the segments reassembled to form a completed air cycle machine.

In turbo charger machines, which include a compressor wheel and a turbine wheel mounted on opposite ends of a shaft supported by force lubricated ball bearings, the bearings have been provided with a cartridge bearing assembly which is located within the turbo charger housing. Since in this type of rotating machine it is necessary to permit shaft excursions when the rotational speed of the shaft passes through critical frequencies, the use of lubricating fluid, such as engine lubricating oil, is employed to both lubricate the ball bearings and also to provide a film of fluid between the cartridge and the housing. To accurately locate the bearing cartridge within the turbocharger housing, it has been disclosed to use a pin which is received in coaxial apertures in the housing and in the outer ring of the bearing cartridge to more accurately locate the bearing cartridge and therefore the shaft, within the turbocharger housing. See, for example, U.S. Pat. No. 5,076,766. Protecting such ball bearings from excessive heat is normally achieved by providing the ball bearings with adequate supply of lubricating oil from a pump driven by an engine, when the engine is running. However, this supply of cooling oil ceases when the engine stops and such ball bearings are vulnerable to the effects of heat-soak which can damage the ball bearings adjacent the turbine rotor.

Gas lubricated bearings have been considered to overcome the problem of lubricant breakdown, especially that which is due to soak-back after shutdown of a turbo compressor with ball bearing cartridges. In general, turbo compressor machines utilizing gas lubricated bearings use dissimilar metals in the rotating portions and the stationary housing portions. The rotating portions are generally constructed from material with higher thermal conductivity, such as low alloyed steels, while the housing portions are constructed from lightweight material, such as aluminum. The use of the dissimilar metals causes differences in the thermal expansion of the metals which has an effect on the tolerances of the bearings used. In order to compensate for this differential thermal expansion, prior art machines locate the bearing assemblies directly within the housing. See, for examples, U.S. Pat. Nos., 4,503,683, 4,725,206, and 4,786,238. This type turbo compressor machine eliminates the use of journal shells, but creates the problems of poor thermal compliance poor mechanical dampening and more costly repairs on failure of the machine because the entire housing must be replaced upon failure of a portion thereof.

There exists a need, therefore, for a journal bearing assembly which achieves improved bearing alignment, and which reduces the problems associated with using two journal bearing assemblies, and which also provides for more efficient and less expensive overhaul and repair upon the failure of bearings.

DISCLOSURE OF THE INVENTION

The primary object of this invention is to provide an improved journal bearing assembly which achieves superior bearing alignment and which reduces the problem associated with using two journal bearing assemblies and overhauling the same.

Another object of this invention is to provide an improved journal bearing assembly including a single piece journal shell having an inner diametrical surface for receiving and aligning multiple air bearings with a rotating shaft of an air cycle machine.

Still another object of this invention is to provide an improved journal bearing shell, which shell is formed from a single piece construction and includes a single inner diametrical surface for receiving and aligning multiple air bearings associated with a rotating shaft of an air cycle machine.

An yet another object of this invention is to provide an improved method for forming a single piece construction journal bearing shell for multiple air bearings, which method allows for the formation of superiorly aligned bearing surfaces for receiving the multiple air bearings associated with a rotating shaft of an air cycle machine. The foregoing objects and advantages disclosed herein are achieved by the journal bearing shell of the present invention which is adapted to receive air bearings for facilitating rotation of a shaft of an air cycle machine. The shell is further adapted to be positioned in a journal bearing housing of the air cycle machine. The shell includes a single piece body structure having a first half integral with a second half, The first half includes a first outside end and the second half includes a second outside end. The first half is sufficiently spaced from the second half for supporting and aligning the bearings for supporting a rotating shaft. The first and second integral halves define a continuously formed inner diameter adapted to receive the rotating shaft and air bearings between the rotating shaft and inner diameter for facilitating rotation of the shaft relative to the body structure. The continuously formed inner diameter extends from the first outside end to the second outside end and an outer surface for placement and securement in the journal bearing housing of the air cycle machine is also provided. The objects and advantages are further facilitated by the journal bearing of the present invention designed for use with a rotatable shaft of an air cycle machine. The bearing includes a journal bearing housing, air bearings for facilitating rotation of the shaft; and a journal bearing shell positioned in the housing. The shell includes a single piece body structure having a first half integral with a second half. The first half includes a first outside end and the second half includes a second outside end. The first half is sufficiently spaced from the second half for supporting and aligning the air bearing for supporting the rotatable shaft. The first and second integral halves define a continuously formed inner diameter adapted to receive the air bearings between the rotatable shaft and the inner diameter for facilitating rotation of the shaft relative to the body structure. The continuously formed inner diameter extends from the first outside end to the second outside end and an outer surface for placement and securement in the journal bearing housing of the air cycle machine is provided.

BRIEF DESCRIPTION OF THE DRAWINGS

FIG. 2 is a side elevational view of the journal shell in accordance with the principles of the present invention; FIG. 2A is a perspective view of the journal shell shown in FIG. 2

FIG. 4 is an end view of the journal shell taken along line 4—4 of FIG. 2;

BEST MODE FOR CARRYING OUT THE INVENTION

Figure 1:
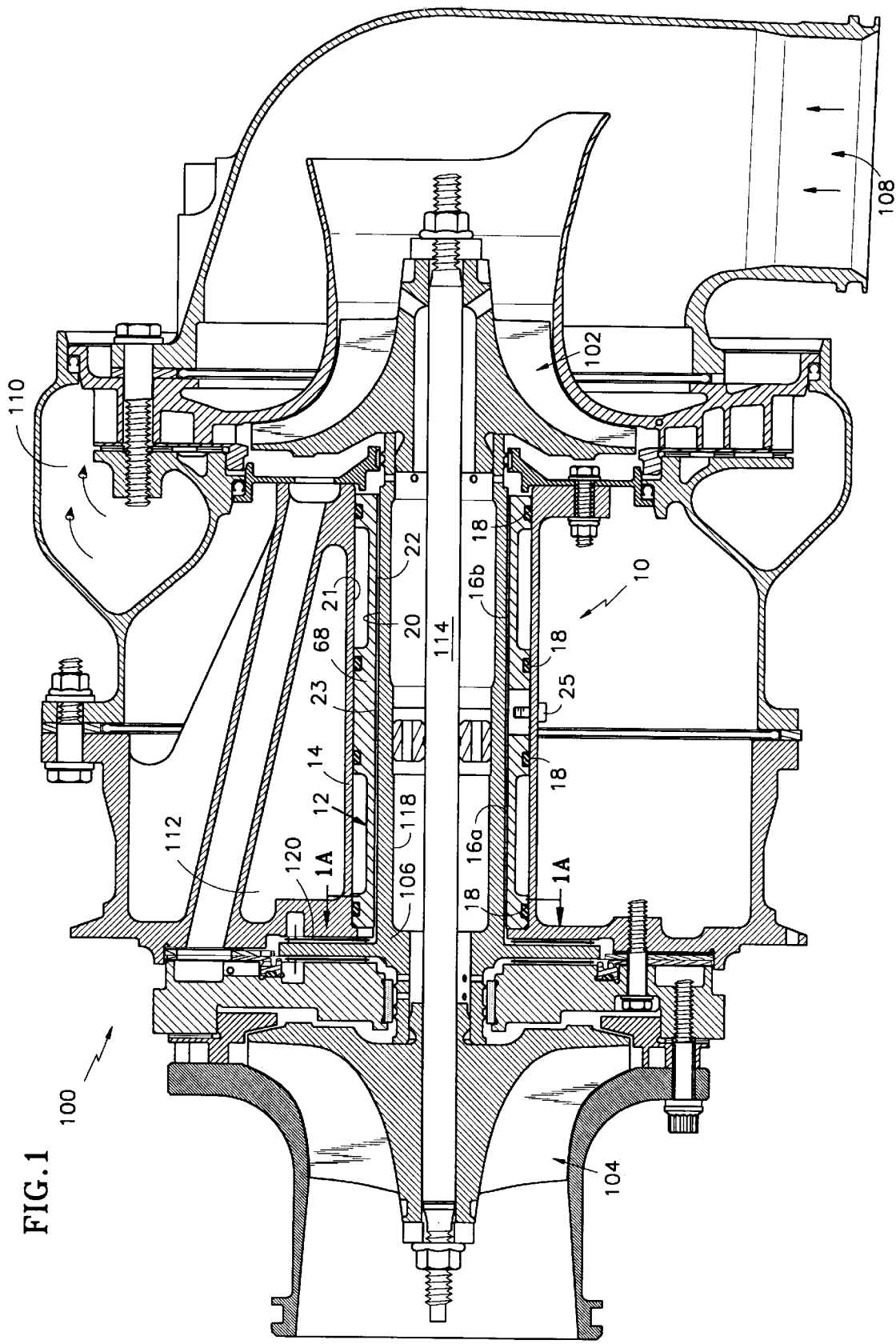
FIG. 1 is a cross-sectional and partial view of an air cycle machine including the bearing arrangement of the present invention installed therein, FIG. IA is a cross-sectional view taken along line IA—IA of FIG. 1.

Referring now to the drawings in detail, there shown in FIG. 1 the bearing assembly of the present invention designated generally as 10, which is shown installed in an air cycle machine 100, in accordance with the principles of the present invention. Bearing assembly 10 generally includes a journal shell 12, a journal bearing housing 14, two hydrodynamic foil bearings 16a and 16b and O-rings 18. As shown in FIG. 1, bearing assembly 10 is positioned in air cycle machine 100 between a compressor 102 and a turbine 104 which are connected in a manner known in the art by a shaft 106, similar to as shown in the background references, U.S. Pat. Nos. 4,503,683 and 5,113,670.

With reference to FIG. 1, air cycle machine 100 functions in a manner as known in the art. That is, compressor 102 further compresses supply air 108 delivered to the compressor inlet from either the aircraft engine compressor bleed system (not shown) or an auxiliary power unit (not shown). Compressor output air 1 10 exiting compressor 102, heated in the compression step, passes subsequently to a heat exchanger (not shown) so that the temperature of the outlet air 1 10 is lowered. Cooled air exits the heat exchanger and then passes to the turbine 104 through inlet 112. The turbine 104 expands this air and produces the power necessary to drive the compressor 102 via shaft 106 as well as the fan (not shown), and also chills the air, allowing it to be used to cool and condition an aircraft cabin (not shown).

As indicated above, shaft 106 connects turbine 104 and compressor 102 and includes an internal shaft portion 114 which directly connects these mechanisms. Shaft portion 114 is rotatable in bearing 116, concentric to inner diametrical surface 118 of shaft 106. Rotation of shaft 106 for transferring power from turbine 104 to compressor 102 is facilitated by a plurality of hydrodynamic bearings including a hydrodynamic thrust bearing 120 and the previously mentioned hydrodynamic journal bearings 16a and 16b. The hydrodynamic thrust bearing 120 is located at the aft end of the machine near the inlet of the turbine 104 and ensures that proper orientation is maintained when the shaft 106 is axially loaded. The hydrodynamic thrust bearing 120 is a hydrodynamic fluid film bearing, as are hydrodynamic journal bearings 16a and 16b. Examples of such bearings are discussed in detail in U.S. Pat. No. 5,113,670, assigned to the Assignee of the present invention.

Referring still to FIGS. 1 and 1A, and to the bearing assembly 10 of the present invention, hydrodynamic bearings 16a and 16b are briefly described as follows and are similar to as described in U.S. Pat. No. 5,113,670, Only bearing 16a is described in detail, it being understood that the description applies equally to bearing 16b. As shown in FIG. 1 A, hydrodynamic journal bearing 16a includes an inner race 20 formed from the outer diametrical surface of shaft 106 and an outer race 22 formed from the inner diametrical surface 23 of journal shell 12. Between inner race 20 and outer race 22 is positioned a foil pack 24 separating the inner and outer races. Accordingly, when shaft 106 rotates, hydrodynamic forces inside foil bearing 16a combine to produce a pressurized region at the inner/outer race interface, both driving the foil pack away from contact with the inner rare 20 and opposing any axial or radial loads tending to force shaft 106 from its desired orientation.

Referring now to FIG. 1 and also FIGS. 2 and 2A, journal shell 12 in accordance with the principles of the present invention is described. Journal shell 12 is retained in the circular bore 21 of the cylindrical housing 14, which is secured between the turbine 104 and compressor 102, as shown, via a single or unitary fastener 25 which engages the wall or opening 23 of the housing 14 and a slot (not shown) in shell 12. This provides an advantage over prior art designs, as discussed in the background, requiring more complicated retention mechanisms, such as envelope type provisions in the form of machined interlocking or meshing members. Hydrodynamic journal bearings 16a and 16b are spaced within journal shell 12 such that the outside ends of each bearings 16a and 16b are near the outside edges 24 and 26, respectively of shell 12. This spacing is used to provide the proper support to shaft 106 within shell 12.

As shown in FIG. 2, the single piece construction journal shell 12 includes a first half 28, a second half 30 and a central portion 32, which are all preferably formed from a single piece of material. As shown in FIG. 2A, journal shell 12 includes a plurality of outer circular surfaces having different size outer diameters. More specifically, first half 28 and second half 30 include lowest outer surfaces 34 and 36 respectively, wherein the surfaces are formed to this lesser diameter for the purpose of weight reduction of journal shell 12. The second lowest surface is in the form of key shaped elements 38 and 40 for first and second sides 28 and 30, respectively. As discussed below, a key way is formed on the inner surface of journal shell 12 at the location of raised key shaped portions 59 and 60. Therefore, the depth of the key shaped portions 59 and 60 is dependent upon the depth of the key way. Lowest diameter surfaces 34 and 36 surround key shaped surfaces 38 and 40, respectively, at the lower diameter since the extra depth for the key weight is not needed on these surfaces and accordingly, substantial weight reduction is obtained. The surfaces with the largest diameters are used to form O-ring grooves 42, 44, 46 and 48, wherein the lowest of the surfaces forms the O-ring seat and the highest of the surfaces form the O-ring retaining walls 49. O-rings 18 are used to locate journal shell 12 to journal housing 14, as shown in FIG. 1 and also for dumping the journal shell during movement as well as protecting the journal shell and housing 14 from direct, potentially damaging contact with each other. This feature is important as the shell is preferably formed from stainless steel and the housing from aluminum. Central portion 32 integrally connects first half 28 with second half 30 via bars 50 extending between the two inner most O-ring grooves 44 and 46. The bars preferably extend at substantially the same radial height as the retaining walls 49 of the O-ring grooves and are separated by a plurality of cut outs 52, which cutouts are also provided for the purpose of reducing the weight of journal shell 12.

Figure 3A:
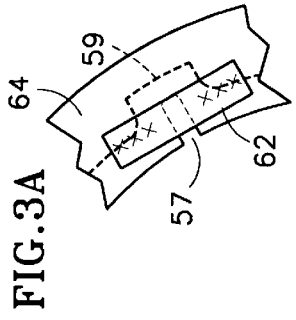
FIG. 3A is an enlarged view of the circled area 3A of FIG. 31
Figure 3:
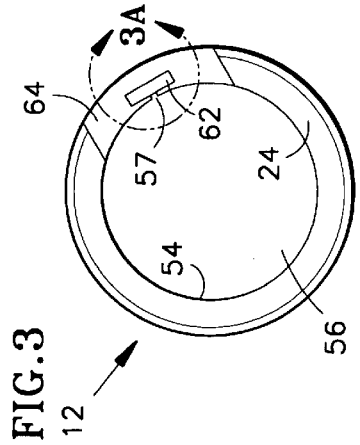
FIG. 3 is an end view of the journal shell shown in FIG. 2 taken along line 3—3.

The inside diameter 54 of journal shell 12 is shown in FIG. 2A and also in the end views of the shell in FIG. 3 and FIG. 4. Inside diameter 54 is constant in diameter, extending from end 56 to end 58 of journal shell 12 and is held to a high tolerance throughout so that bearings 16a and 16b are in alignment with each other when installed in shell 12, as shown in FIG. 1. Since one of the most important operating parameters associated with the use of hydrodynamic journal bearings is journal alignment, the continuously formed diameter 54 provides the advantage of instant alignment of the bearings. That is, since the diameter 54 is formed in a continuous operation in a one piece shell 12, tolerances and alignment are held constant throughout, With one continuously formed bore having inner diameter 54 adapted to receive multiple air bearings 16a and 16b, the use of the same to position the foils of both bearings is a paramount factor in achieving the utmost in alignment.

Figure 8:
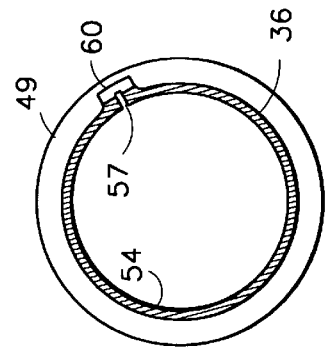
FIG. 8 is another cross-sectional view of the journal shell shown in FIG. 2 taken along line 8—8.
Figure 7:
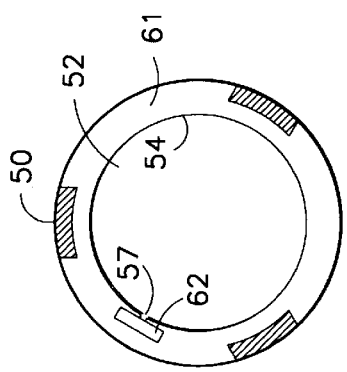
FIG. 7 is another cross-sectional view of the journal shell shown in FIG. 2 taken along line 7—7.
Figure 6:
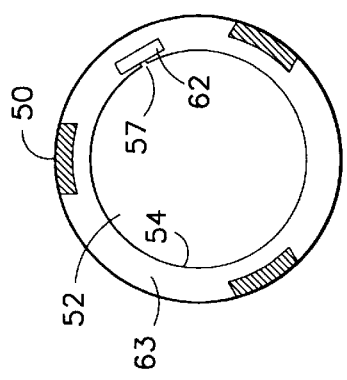
FIG. 6 is a cross-sectional view of the journal shell shown in FIG. 2, taken along line 6—6.
Figure 5:
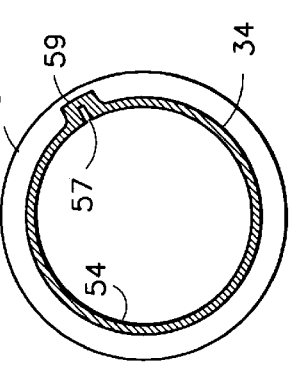
FIG. 5 is a cross-sectional view of the journal shell shown in FIG. 2 taken along line 5–51

As indicated above, key way 57, as shown in FIG. 3A by dotted lines and in FIG. 5, is formed in surface 54 from end 56 to end 58 of shell 12. Key way 57 is also preferably formed in a continuous operation and includes two portions, portion 59, as shown in FIG. 3A, for half 28 starting from end 56 and ending in opening 52 and portion 60 for half 30, beginning in opening 52 and ending at end 58 of shell 12, as indicated in FIGS. 4 and 8. To prevent rotation of the foils of bearing 16a and 16b within journal shell 12, the foil combination includes key 55, as shown in FIGS. 1 A, 4 and 5, for engaging each of the key way portions 59 and 60, respectively. So as to prevent axial movement of the foils in the key way portions, they are blocked at ends 56 and 58, as shown in FIGS. 3, 3A, and 4, and at ends 61 and 63 within opening 52, as similarly shown in FIGS. 6 and 7, via the welding of stops 62 over the ends. The arrangement shown in FIG. 3A is applicable to all four open ends 56, 58, 61, 63, associated with each of the two key way portions 58 and 60, as shown by FIGS. 3. 4, 6 and 7. Stops 62 are preferably welded on journal shell 12 transverse the longitudinal direction of the key way portions. To prevent the extension of stops 62 beyond the ends 56 and 58 of shell 12, recesses 64 and 66 are provided in ends 56 and 58, respectively, to recess the stops. In addition, the recesses provide for additional weight reduction of journal shell 12.

Journal shell 12 is preferably formed in a continuous forming process, most preferably by machining, however other suitable processes, if available, may be equally applicable. Regardless of the formation process used, the inner diametrical surface 54 is formed through the length of journal shell 12 as one bore such that tolerances and therefore the alignment, of the first and second half 28 and 30 and the inner diametrical surface portions thereof, are substantially equivalent to very high tolerances. In this manner, no post installation alignment is necessary since bearing 16a and 16b are inherently aligned by placement in the common bore 68 of shell 12, as defined by surface 54.

In operation, journal shell 12 is located and sealed in internal housing 18 by the use of O-rings and O-ring grooves 42, 44, 46 and 48 shell 72 is fastened to housing 68 via fastener 25. The foil packs 24, as shown in FIG. IA, are secured via the key way portions 59 and 60 of shell 12, via keys 55 formed on each of the foil packs 24 of bearings 16a and 16b, respectively, so as to prevent relative rotation of the foil packs with regard to journal shell 12. Accordingly, as turbine 104 spins, expands the air, and rotates shaft 106 along with compressor 102, air flow is developed between the inner race 20 of shaft 106 and the foil packs 24 of bearings 16a and 16b thereby creating an air cushion between the shaft 106 and the foil packs 24 and accordingly, a frictionless bearing assembly.

The primary advantage of this invention is that an improved journal bearing assembly is provided which achieves superior bearing alignment and which increases the efficiency of assembling and overhauling the same. Another advantage of this invention is that an improved journal bearing assembly is provided including a single piece journal shell having an inner diametrical surface for receiving and aligning multiple air bearings with a rotating shaft of an air cycle machine. Still another advantage of this invention is that an improved journal bearing shell is provided, which shell is formed from a single piece construction and includes a single inner diametrical surface for receiving and aligning multiple air bearings associated with a rotating shaft of an air cycle machine. An yet another advantage of this invention is that an improved method is provided for forming a single piece construction journal bearing shell for multiple air bearings, which method allows for the formation of superiorly aligned bearing surfaces for receiving the multiple air bearings associated with a rotating shaft of an air cycle machine.

Although the invention has been shown and described with respect to a best mode embodiment thereof, it should be understood by those skilled in the art that the foregoing and various other changes, omissions, and additions in the form and detail thereof may be made without departing from the spirit and scope of the invention.

We claim:

1. A journal bearing for a rotatable shaft of an air cycle machine, comprising:

a journal bearing housing;

a journal bearing shell positioned in said housing, wherein said shell includes: a single piece body structure having a first half integral with a second half, disposed along a common axis wherein said first half is adapted to receive a first hydrodynamic fluid bearing means an said second half is adapted to receive a second hydrodynamic fluid bearing means, wherein said first half includes a first outside end and said second half includes a second outside end, and wherein said first half is sufficiently spaced from said second half for supporting and aligning said first and second hydrodynamic fluid bearing means along said common axis for supporting said rotatable shaft, said first and second integral halves defining a continuously formed inner diameter adapted to receive said first and second hydrodynamic fluid bearing means between said rotatable shaft and said inner diameter for facilitating rotation of the shaft relative to said body structure, wherein said continuously formed inner diameter extends from said first outside end to said second outside end; and an outer surface for placement and securement in the journal bearing housing of the air cycle machine.

2. The journal bearing according to claim 1, consisting of a single fastener for fastening said journal bearing shell to said journal bearing housing.

3. The journal bearing according to claim 1, wherein said first and second hydrodynamic fluid bearing means comprises multiple hydrodynamic fluid bearings positioned adjacent to and secured with said inner diameter of said journal bearing shell, wherein said multiple hydrodynamic fluid bearings are sufficiently spaced from each other on said continuously formed inner diameter for supporting the rotating shaft.

4. The journal bearing according to claim 1, further comprising an inner surface defining said inner diameter, wherein said first half and said second half are connected to each other by a common and integral portion of said inner surface.

5. The journal bearing according to claim 1, further comprising means for damping said single piece body structure and protecting said body structure form direct contact with said housing, wherein said outer surface includes means for engaging a plurality of said means for damping and protecting and for locating said means for damping and protecting between said body structure and said journal bearing housing.

6. The journal bearing according to claim 1, further comprising an inner surface defining said inner diameter, wherein said inner surface includes a means for engaging and preventing relative rotation of said first and second hydrodynamic fluid bearing means in said body structure.

7. The journal bearing according to claim 1, wherein said first and second hydrodynamic fluid bearings include keys, and said means for engaging comprise keyways in said inner surface adapted to engage said keys.

8. The journal bearing according to claim 1, further including a center portion positioned between said first half and said second half, said center portion including at least one opening for reducing the weight of said single piece body structure.

9. The journal bearing according to claim 8, wherein said center portion is continuous and integral with each of said first half and said second half.

\* \* \* \* \*